United States Patent
Donnelly

(10) Patent No.: US 9,944,299 B2
(45) Date of Patent: Apr. 17, 2018

(54) MULTI-ENGINE LOCOMOTIVE PROPULSION

(71) Applicant: Tractive Power Corporation, North Vancouver (CA)

(72) Inventor: Frank Wegner Donnelly, North Vancouver (CA)

(73) Assignee: Tractive Power Corporation, North Vancouver (CA)

( * ) Notice: Subject to any disclaimer, the term of this patent is extended or adjusted under 35 U.S.C. 154(b) by 0 days.

(21) Appl. No.: 14/921,592

(22) Filed: Oct. 23, 2015

(65) Prior Publication Data
US 2016/0114814 A1    Apr. 28, 2016

Related U.S. Application Data

(60) Provisional application No. 62/068,436, filed on Oct. 24, 2014.

(51) Int. Cl.
| | | |
|---|---|---|
| *B61C 3/00* | (2006.01) | |
| *H02J 5/00* | (2016.01) | |
| *B60L 15/00* | (2006.01) | |
| *H02P 5/68* | (2006.01) | |

(52) U.S. Cl.
CPC ............. *B61C 3/00* (2013.01); *B60L 15/007* (2013.01); *H02J 5/00* (2013.01); *H02P 5/68* (2013.01); *B60L 2200/26* (2013.01); *B60L 2220/42* (2013.01); *Y02T 10/645* (2013.01); *Y02T 10/648* (2013.01)

(58) Field of Classification Search
CPC ..... B62C 3/00; H02J 5/00; B26C 3/00; B60L 11/00; B60L 2220/26; B61C 3/00; B61C 5/00; Y02T 10/644; Y02T 10/648
See application file for complete search history.

(56) References Cited

U.S. PATENT DOCUMENTS 4,394,722 A * 7/1983 Nero .................. H02M 7/10
                                                315/411
4,777,406 A * 10/1988 Ross ................... H01J 25/38
                                                315/3.5
(Continued)

FOREIGN PATENT DOCUMENTS

RU        2216883 C2 * 11/2003

OTHER PUBLICATIONS

International Search Report and Written Opinion for International (PCT) Patent Application No. PCT/IB2015/002171, dated Feb. 11, 2016, 9 pages.

*Primary Examiner* — Viet Nguyen
*Assistant Examiner* — Joseph Ortega
(74) *Attorney, Agent, or Firm* — Sheridan Ross P.C.

(57) ABSTRACT

A multi-engine locomotive configuration is disclosed wherein engine outputs to DC traction motors are controlled by connecting the alternators with rectifiers in series for each engine of a multi-engine locomotive. This configuration uses the minimum number of rectifying diodes, eliminates the need for chopper circuits and simplifies the method of controlling the sequencing and output of two or more engines. The approach, which reduces the parasitic power loss by reducing the number of diodes, also enables a simplified means to efficiently manage engine cooling without additional cost and complexity of electrically-driven radiator fans.

23 Claims, 14 Drawing Sheets

(56) References Cited

U.S. PATENT DOCUMENTS

| | | | |
|---|---|---|---|
| 5,991,178 A * | 11/1999 | Arnould | H01F 27/22 363/126 |
| 6,308,639 B1 | 10/2001 | Donnelly et al. | |
| 6,615,118 B2 * | 9/2003 | Kumar | B60L 7/12 290/3 |
| 6,812,656 B2 | 11/2004 | Donnelly et al. | |
| 6,984,946 B2 | 1/2006 | Donnelly et al. | |
| 7,126,293 B1 * | 10/2006 | Kumar | B60L 15/36 180/197 |
| 7,304,445 B2 | 12/2007 | Donnelly | |
| 7,324,359 B2 * | 1/2008 | Schreiber | H02M 7/19 363/68 |
| 7,518,254 B2 | 4/2009 | Donnelly et al. | |
| 7,667,347 B2 * | 2/2010 | Donnelly | B60L 11/123 307/10.1 |
| 7,906,862 B2 | 3/2011 | Donnelly et al. | |
| 8,220,572 B2 | 7/2012 | Donnell | |
| 2002/0159278 A1 * | 10/2002 | Plasse | H02M 7/08 363/71 |
| 2006/0076171 A1 * | 4/2006 | Donnelly | B60L 7/04 180/65.225 |
| 2008/0049460 A1 * | 2/2008 | Mohan | H02M 5/271 363/34 |
| 2010/0066085 A1 * | 3/2010 | Gu | F03D 7/0272 290/44 |
| 2013/0013231 A1 * | 1/2013 | Banerjee | B60L 3/0061 702/58 |
| 2016/0075345 A1 * | 3/2016 | Sonnleitner | B61C 5/00 701/19 |

* cited by examiner

Figure 2 (Prior Art from US 4,936,610)

MULTI-ENGINE LOCOMOTIVE PROPULSION

CROSS REFERENCE TO RELATED APPLICATION

This application claims the benefit of U.S. Provisional Patent Application No. 62/068,436 entitled "Multi-Engine Locomotive Propulsion" filed Oct. 24, 2014, the entire disclosure of which is incorporated by reference herein.

FIELD

Embodiments of the present invention are generally related to locomotive propulsion and control utilizing multiple engines, each engine driving alternators with rectifiers connected in series, wherein the number of rectifying diodes is reduced and wherein chopper circuits are eliminated when DC traction motors are used.

BACKGROUND

Locomotives utilizing multiple engines are known. Multi-engine electrical connections and control methods are described, for example, in U.S. Pat. Nos. 7,304,445; 7,667,347 and 8,220,572 (each incorporated by reference in entirety).

In single engine locomotives using DC traction motors, the speed of the engine and the excitation of the engine's alternator are typically used to control the voltage across the traction motors so that, upon locomotive start-up, the current through the traction motors can be maintained within acceptable limits until a back-emf develops with increasing traction motor speed.

FIG. 1 illustrates a DC traction motor current as a function of locomotive speed. The current is initially very high because of the low electrical resistance of the traction motors. As the speed of the locomotive increases, a back-emf is developed within the traction motor which reduces the current through the traction motor as locomotive speed increases.

FIG. 2 illustrates a DC traction motor back-emf as function of traction motor field current. The back-emf is expressed as volts per traction motor rpm.

In the early 2000s, hybrid locomotives were developed whereby a small engine was combined with a large battery pack such as described in U.S. Pat. No. 6,308,639 and U.S. Pat. No. 6,812,656 (each incorporated by reference in entirety) for example. In these locomotives, the battery pack voltage when applied to a DC bus, clamps a large voltage across the traction motors thereby establishing too high a voltage, and hence too high a current, upon locomotive start-up. The solution to this problem was to use chopper circuits with each traction motor to control voltage across the traction motors as described in U.S. Pat. No. 6,812,656 and U.S. Pat. No. 6,984,946 (each incorporated by reference in entirety) for example.

Shortly after the introduction of the battery dominant hybrid locomotive, multi-engine locomotives were introduced. These multi-engine locomotives have come to be known as 'genset' locomotives. Initially these genset locomotives used two or more engines driving alternators with their rectifier networks connected electrically in parallel to a DC bus. The traction motor circuits connected to the DC bus retained the chopper circuits to control voltage across the traction motors. The chopper circuit voltage control system was also retained in disclosures of multi-engine locomotives with engines driving alternators with rectifiers connected in series (see FIG. 23 of U.S. Pat. No. 7,667,347, incorporated by reference in entirety). Retaining the chopper voltage control method has an advantage in control of wheel slip and the ability to deliver both high current and high voltage to the traction motors. However, such chopper control adds considerable expense and complexity to the point that these advantages are discounted because of the additional complexity especially in control and operation. The genset locomotives can now be viewed as a failed experiment judging by examples of customers acquiring single engine locomotives to replace their genset locomotives.

Genset locomotives typically use an algorithm linked to the throttle to manage engines in order to select a combination of generators to meet the desired overall locomotive power. Delays caused by engine starting and accelerating affects throttle response more and more with an increase in throttle. Conversely, needless running of an engine or engines, typically occurring by lowering the throttle, causes a time delay in shutting down this unneeded power. Software is used because there are a number of ways to balance engine outputs and locomotive response, depending on the objective (maximum power, fuel economy, engine life, emissions profile etcetera). This has led to some dissatisfaction by locomotive operators who are accustomed to having more operational control and more responsive control over locomotive power, tractive effort and speed.

Genset locomotives may also experience engine lifetime issues because of the practice of high-speed idle necessary to maintain sufficient DC bus voltage to operate the traction motor chopper circuits and to operate the auxiliary equipment.

The genset locomotive has been promoted as locomotive with low exhaust emissions. Areas like the Los Angeles with its unhealthy air-shed have deployed genset locomotives in an effort to reduce air pollution from locomotives. These genset locomotives are used mainly for switching in rail yards and cargo terminals. Genset locomotives are considered purpose-built switcher locomotives characterized by relatively low horsepower and low speed operation.

The reason genset locomotives have lower emissions than conventional locomotives is that they use multiple high-speed diesel engines (typically 2 to about 4) that are inherently cleaner than a single large, medium-speed locomotive diesel engine. Additionally the power requirement for the locomotive can be provided through the selection of engines as needed. Low speed movement of large group of rail cars may require high starting tractive effort (about 50,000 lbs or more) but, because of low speed operation (less than about 5 mph), a 600 HP engine is typically sufficient. Operating one 600 HP engine reduces both fuel consumption and emissions compared to operation of a 2,000 HP engine doing the same task. If the same group of cars must be accelerated to a speed higher than about 10 mph, as in the practice of "flat switching" and "kicking cars", a second engine can be brought on-line.

Because the handling requirements of railcars in rail yards, cargo terminals and other industrial settings, deciding on the number of engines to engage can be separated into two regimes based on locomotive speed. At low speed, tractive effort is typically maximized. At high speed, engine voltage must be maintained to overcome the back emf. Having a multi-engine locomotive has merit. Having engines driving alternators with rectifiers whose output is electrically connected in series is a practical means of configuring the traction power circuit without going to the added cost and complexity of power electronics and associated requirements.

There is a need for a simplified method of electrically connecting the alternators with rectifiers for each engine of a multi-engine locomotive and a simplified method of controlling the sequencing and output of two or more engines.

SUMMARY

These and other needs are addressed by the present disclosure. The various embodiments and configurations of the present disclosure are directed generally to a method of electrically connecting the alternators with rectifier networks of two or more engines in series wherein the number of rectifying diodes in a network of bridge circuits is reduced compared to current practice. The present disclosure is also directed at controlling engine outputs to DC traction motors wherein chopper circuits are eliminated and control is simplified. The output of each engine is controlled by controlling the excitation applied to the alternator of each engine. This approach, because it eliminates the need for high speed idle, also enables a simplified means to efficiently manage engine cooling without additional cost and complexity of electrically-driven radiator fans required by prior art genset locomotives.

Besides lower cost and innate simplicity, the configuration of multiple engines driving alternators with rectifiers in series without choppers has notable advantages over the configuration of multiple engines driving alternators with rectifiers in parallel with traction motor choppers or the configuration of multiple engines driving alternators with rectifiers in series with traction motor choppers.

Some of these advantages are:
1) Quieter operation because the engine or engines idle at low speed rather than at a high speed. This high speed idle on prior art designs is required because currently available genset locomotives must maintain a high DC bus voltage for the chopper power electronics and auxiliaries;
2) Lower fuel consumption and emissions because the engines can idle at lower speeds. The ability to idle at low speeds is important since most genset locomotives spend over half their operating time at idle;
3) Easier to support and maintain without the need for highly trained specialists in proprietary technology;
4) Lower engine maintenance cost and longer engine life because the engines can idle at low speed; and
5) Greater selective catalytic reduction ("SCR") conversion efficiency because the higher exhaust temperatures generated at low speed idle are closer to optimum conditions for efficient SCR than the lower exhaust temperatures characteristic of high speed idle. At low speed idle, exhaust temperatures are higher because the engines are run lean.

The present disclosure is an improvement in the allocation of rectifying diodes over that of U.S. Pat. No. 7,667,347 (incorporated by reference in entirety) by a reconfiguration of the bridge network. As any number of engines may have their alternators connected in series, it can be shown that the number of rectifying diodes is equal to 6 times the number of engines driving alternators connected in series in the U.S. Pat. No. 7,667,347 diode bridge network configuration (for example, a 3 engine locomotive requires 18 diodes).

In the invention disclosed herein, it can be shown that the number of rectifying diodes is equal to 3 times the number of engines driving alternators connected in series plus 3 (for example, a 3 engine locomotive requires 12 diodes).

Since these rectifying diodes are expensive (typically about $500 to $600 per diode) and require air-cooling, this improvement would result in significant capital cost savings. There is about a 1 volt drop across each diode at 2,000 amperes, on a 4-axle locomotive at maximum tractive effort, so the waste heat generated per diode represents a useful power loss of about 2 kW per extra diode at full current. Also, each air-cooled rectifying diode takes up valuable space in a locomotive engine compartment.

In the case of 2 engines driving alternators connected in series, this reconfiguration of the bridge network would result in an increase in total locomotive output power of about 6 kW at full power. In the case of 3 engines driving alternators connected in series, this reconfiguration of the bridge network would result in an increase in total locomotive output power of about 12 kW at full current for maximum tractive effort. In the case of 5 engines driving alternators connected in series, this reconfiguration of the bridge network would result in an increase in an increase in total locomotive output power of about 24 kW at full current.

In addition, the present disclosure describes a multi-engine configuration with engines driving alternators with rectifiers connected in series wherein the DC traction motor circuits do not require expensive chopper circuits and these chopper circuits can be eliminated.

In the present disclosure, control of the power output of the engines driving alternators with rectifiers connected in series differs from that of the prior art engines driving alternators with rectifiers connected in parallel in that the engine outputs are monitored by conventional means and there is no need for load control by chopper circuits and auxiliaries for engine cooling.

In the present disclosure, locomotive load control is accomplished by 1) controlling the load on the engine through a control loop that senses the load on the engine and 2) by controlling the torque loading of the engine's alternator by the excitation applied to the alternator. This control loop between the engine and alternator is active throughout all or most of the engine's speed spectrum and as the back-emf changes with speed of the traction motors.

Each engine has an Engine Control Unit ("ECU"). One of its many possible readouts is the percentage of full load capacity that the engine is outputting. Another readout is the aggregate amount of fuel burned by each engine which is substantially a direct measure of engine lifetime.

The balancing of each engines output power can be accomplished automatically by a micro-controller, in direct communication with the engine ECUs and alternators which would free the engineer from the task of direct control over the operating engines. The engineer would have the ability to select the power, speed and performance of the locomotive by the number of engines engaged. The selection as to which engines are operated at specific times can be automatically managed by the locomotive's micro controller to lengthen times between engine servicing and overhauls.

Thus the decision on which mode to favor (maximum power, maximum fuel efficiency, maximum engine lifetime or minimum emissions) would be returned to control by the locomotive engineer and not be reliant on a programmed controlled response.

In one embodiment of the invention, a traction power system for use with a multi-engine locomotive is disclosed, the system comprising: at least two engines, each engine comprising an alternator with a rectifier bridge, the rectifier bridge comprising diodes, the number of at least two engines defining an engine count, the number of diodes defining a diode count; wherein the rectified output of the alternators are electrically connected in series across a DC bus; wherein the diode count is less than six times the engine count.

In some embodiments, wherein the at least two engines comprise at least one DC traction motor; wherein chopper circuits are not utilized and the diode count is three plus three times the engine count; wherein the at least two engines each further comprise an engine control unit; wherein the multi-engine locomotive is configured to idle at low speed; wherein each DC traction motor is associated with a power contact switch and a reverser switch; further comprising a plurality of rectifying diodes, the plurality of rectifying diodes less than those required if the alternators are electrically connected in parallel across a DC bus; further comprising a microcontroller in communication with each engine control unit and with each engine alternator; wherein the microcontroller controls a power output of the multi-engine locomotive by varying speed and power of at least one engine; wherein the microcontroller controls the power output without a chopper circuit; wherein the microcontroller is configured to operate the multi-engine locomotive in operational modes comprising maximum power, maximum fuel efficiency, maximum engine lifetime and minimum emissions; wherein at least two engines of the at least two engines are of different size, wherein the at least two engines of the at least two engines comprise alternators and rectifiers of a same current handling capacity; wherein at least two engines of the at least two engines are configured to operate at different speeds and at different outputs; wherein at least two engines of the at least two engines are configured to operate from an on throttle at a same speed and same output; and wherein at least two engines of the at least two engines are configured for selective operation.

In another embodiment, a method to control power output for use with a multi-engine locomotive is disclosed, the method comprising: providing a traction power system comprising at least two engines, each engine including an engine and load control system and an alternator with a rectifier, the rectifier bridge comprising diodes, the number of at least two engines defining an engine count, the number of diodes defining a diode count, wherein the rectified output of the alternators are electrically connected in series across a DC bus, wherein the diode count is less than six times the engine count; selecting a set of engines of the multi-engine locomotive; selecting a DC bus voltage; setting a desired power level for the set of engines; and balancing the set of engines to achieve the desired power level.

In some embodiments, the method further comprises the step of receiving a load set-point output from the engine control system of each engine; wherein the balancing is performed by at least one of adjusting an alternator excitation current and adjusting an engine speed of the at least two engines; wherein the at least two engines comprise at least one DC traction motor; wherein chopper circuits are not utilized and the diode count is three plus three times the engine count; wherein the multi-engine locomotive is configured to idle at low speed; wherein each DC traction motor is associated with a power contact switch and a reverser switch; further comprising a microcontroller in communication with each engine control unit and with each engine alternator; and wherein the balancing may be performed manually.

The following definitions are used herein:

Alternator speed is the rotary speed of the alternator rotor and is typically expressed in rpms. The alternator speed is commonly the same as engine speed since they are usually directly connected with no intermediate gearing.

A battery-dominant hybrid locomotive is a dual-mode hybrid locomotive where the energy storage apparatus is a battery pack and the battery pack is capable of supplying approximately as much or more instantaneous power than the prime power source when both are engaged with the propulsion system.

A diesel-electric locomotive is commonly a diesel powered railroad prime mover which includes an engine, generator, and traction motors on each propulsion axle.

The duty cycle of an IGBT is the ratio of time that the IGBT is switched on (conducting) to the total time that the IGBT is switched on (conducting) and off (non-conducting).

A driver (or driven) axle is a rotating axle that transmits power from the propulsion system to the rails. A driver may refer to an axle or a wheel.

Dynamic braking is typically implemented when the electric propulsion motors are switched to generator mode during braking to augment the braking force. The electrical energy generated is typically dissipated in a resistance grid system. Dynamic braking can also be accomplished using pneumatics or hydraulics.

An electrical energy converter refers to an apparatus that transmits or blocks the flow of electrical energy and may also increase or reduce voltage and change the frequency of the transmitted energy including changing the frequency to zero. Examples but are not limited to an inverter, a rectifier circuit, a chopper circuit, a controlled rectifier such as a cycle converter, a boost circuit, a buck circuit and a buck/boost circuit.

An engine refers to any device that uses energy to develop mechanical power, such as motion in some other machine. Examples are diesel engines, gas turbine engines, microturbines, Stirling engines and spark ignition engines.

An engine control unit (ECU), also called the power-train control module (PCM), is a type of electronic control unit that controls a series of actuators on an internal combustion engine to ensure optimal engine performance. It does this by reading values from a multitude of sensors within the engine bay, interpreting the data using multidimensional performance maps and adjusting the engine actuators accordingly. Before ECUs, air/fuel mixture, ignition timing, and idle speed were mechanically set and dynamically controlled by mechanical and pneumatic means. A special category of ECUs are those which are programmable. These units do not have a fixed behavior and can be reprogrammed by the user. Programmable ECUs are required where significant aftermarket modifications have been made to a vehicle's engine. Examples include adding or changing of a turbocharger, adding or changing of an intercooler, changing of the exhaust system or a conversion to run on alternative fuel. The programmable ECU may control the amount of fuel to be injected into each cylinder. Other parameters that are often mappable are: ignition timing; rev limit which defines the maximum RPM that the engine is allowed to reach; water temperature correction which allows for additional fuel to be added when the engine is cold; transient fueling which tells the ECU to add a specific amount of fuel when throttle is applied; low fuel pressure modifier which tells the ECU to increase the injector fire time to compensate for an increase or loss of fuel pressure; closed loop lambda which lets the ECU monitor a permanently installed lambda probe and modify the fueling to achieve the targeted air/fuel ratio desired; wastegate control which controls the behavior of a turbocharger's wastegate, controlling boost; staged injection which allows for an additional injector per cylinder, used to get a finer fuel injection control and atomization over a wide RPM range; variable cam timing which allows for control variable intake and exhaust cams; gear control which tells the ECU to cut ignition during upshifts or blip the throttle during downshifts. ECUs also provide readouts of an engine's load as a percentage of maximum load capability.

Engine speed is the rotary speed of the engine output drive shaft and is typically expressed in rpms.

An engine system as used herein refers to the engine and its mechanical-to-electrical energy conversion device so the output power of an engine system is electrical.

An idler axle is a rotating axle that is not powered. An idler may refer to an axle or a wheel.

An IGBT is Insulated Gate Bipolar Transistor which is a power switching device capable of sequentially chopping a voltage waveform at a very fast rate. It is typically a component in a chopper circuit.

A locomotive is generally a self-propelled railroad prime mover which is powered by one or more engines where the engines may be steam engines, diesel engines or gas turbine engines. A locomotive may also be powered externally such as from an overhead electrical catenary or an electrical third rail.

Locomotive load control is a means of controlling the load on the engine through a control loop that senses the load on the engine and controls the torque loading of the engine driven alternator with the excitation of the alternator. This control loop between the engine and alternator is active throughout or most of the engine's speed spectrum and the speed of the traction motors with changing back-emf.

Locomotive speed is the speed of the locomotive along the tracks and is typically expressed in miles per hour or kilometers per hour.

A mechanical-to-electrical energy conversion device refers an apparatus that converts mechanical energy to electrical energy. Examples include but are not limited to a synchronous alternator such as a wound rotor alternator or a permanent magnet machine, an asynchronous alternator such as an induction alternator, a DC generator, and a switched reluctance generator.

A motor refers to a device that produces or imparts motion.

A prime power source refers to any device that uses energy to develop mechanical or electrical power, such as motion in some other machine. Examples are diesel engines, gas turbine engines, microturbines, Stirling engines, spark ignition engines or fuel cells.

SCR means Selective Catalytic Reduction.

A traction motor is a motor used primarily for propulsion such as commonly used in a locomotive. Examples are an AC or DC induction motor, a permanent magnet motor and a switched reluctance motor.

Tractive effort is the force applied by the driving wheels parallel to the track. Tractive effort is a synonym of tractive force, typically used in railway engineering terminology when describing the pulling power of a locomotive. The tractive effort provided by a particular locomotive varies depending on speed and track conditions, and is influenced by a number of other factors.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any storage and/or transmission medium that participate in providing instructions to a processor for execution. Such a computer-readable medium is commonly tangible, non-transitory, and non-transient and can take many forms, including but not limited to, non-volatile media, volatile media, and transmission media and includes without limitation random access memory ("RAM"), read only memory ("ROM"), and the like. Non-volatile media includes, for example, NVRAM, or magnetic or optical disks. Volatile media includes dynamic memory, such as main memory. Common forms of computer-readable media include, for example, a floppy disk (including without limitation a Bernoulli cartridge, ZIP drive, and JAZ drive), a flexible disk, hard disk, magnetic tape or cassettes, or any other magnetic medium, magneto-optical medium, a digital video disk (such as CD-ROM), any other optical medium, punch cards, paper tape, any other physical medium with patterns of holes, a RAM, a PROM, and EPROM, a FLASH-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored. Computer-readable storage medium commonly excludes transient storage media, particularly electrical, magnetic, electromagnetic, optical, magneto-optical signals.

The terms "determine", "calculate" and "compute," and variations thereof, as used herein, are used interchangeably and include any type of methodology, process, mathematical operation or technique.

The term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The term "module" as used herein refers to any known or later developed hardware, software, firmware, artificial intelligence, fuzzy logic, or combination of hardware and software that is capable of performing the functionality associated with that element.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

One of ordinary skill in the art will appreciate that embodiments of the present disclosure may be constructed of materials known to provide, or predictably manufactured to provide the various aspects of the present disclosure. These materials may include, for example, stainless steel, titanium alloy, aluminum alloy, chromium alloy, and other metals or metal alloys. These materials may also include, for example, carbon fiber, ABS plastic, polyurethane, and other fiber-encased resinous materials, synthetic materials, polymers, and natural materials. The system and its elements could be flexible, semi-rigid, or rigid and made of materials such as stainless steel, titanium alloy, aluminum alloy, chromium alloy, and other metals or metal alloys, carbon fiber, ABS plastic, polyurethane, and other fiber-encased resinous materials, synthetic materials, polymers, and natural materials.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The exemplary systems and methods of this disclosure have been described in relation to traction power systems and locomotives. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a microcontroller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The preceding is a simplified summary of the disclosure to provide an understanding of some aspects of the disclosure. This summary is neither an extensive nor exhaustive overview of the disclosure and its various aspects, embodiments, and/or configurations. It is intended neither to identify key or critical elements of the disclosure nor to delineate the scope of the disclosure but to present selected concepts of the disclosure in a simplified form as an introduction to the more detailed description presented below. As will be appreciated, other aspects, embodiments, and/or configurations of the disclosure are possible utilizing, alone or in combination, one or more of the features set forth above or described in detail below.

BRIEF DESCRIPTION OF THE DRAWINGS

The disclosure may take form in various components and arrangements of components, and in various steps and arrangements of steps. The drawings are only for purposes of illustrating the preferred embodiments and are not to be construed as limiting the invention. In the drawings, like reference numerals refer to like or analogous components throughout the several views.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

| Component | # |
|---|---|
| Engine Alternator | 1 |
| Rectifying Diode | 2 |
| Output Terminals | 3 |
| Traction Motor | 4 |
| Chopper | 5 |
| Free Wheeling Diode | 6 |
| DC Bus Positive Terminal | 7 |
| DC Bus Negative Terminal | 8 |
| Current Monitor | 10 |
| Traction Motor Grouping | 11 |
| DC Traction Motor | 21 |
| Traction Motor Field Coil and Reverser Switch | 22 |
| Traction Motor Armature | 23 |
| IGBT (Chopper) | 24 |
| Free Wheeling Diode | 25 |
| Filter capacitor | 26 |
| Traction Motor Power Contact Switch | 27 |

DETAILED DESCRIPTION

Prior Art Engines with Alternators with Rectifier Bridge Networks in Series

Figure 1:
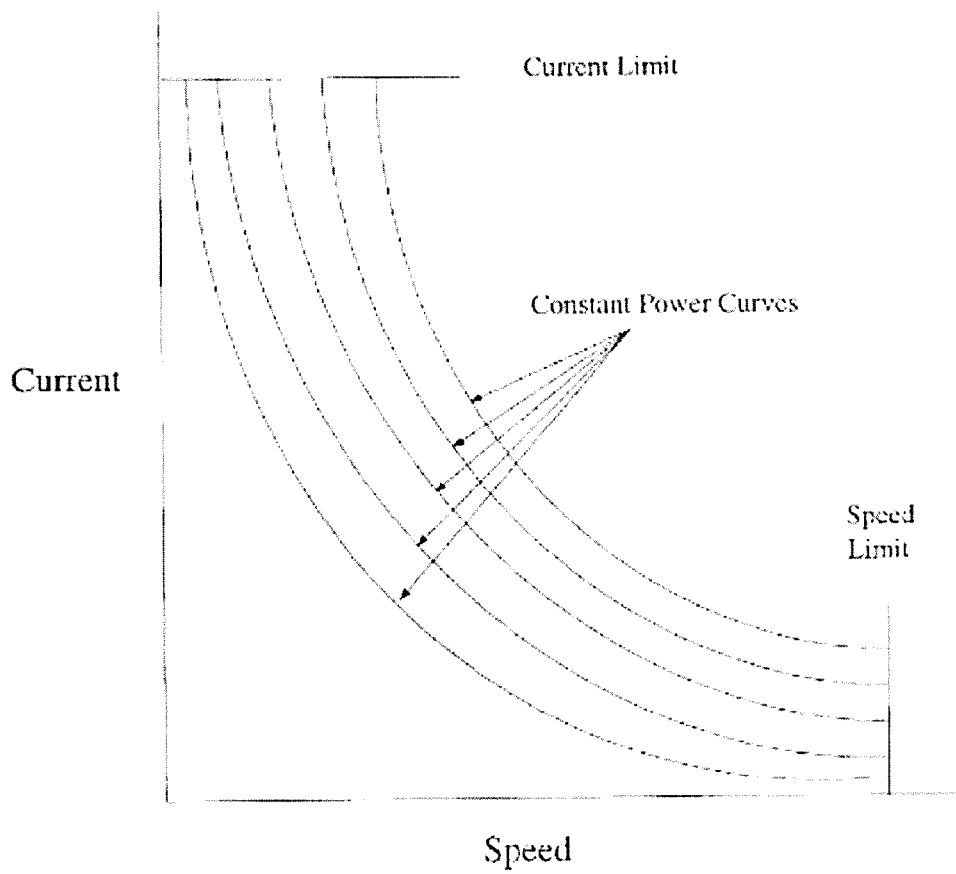
FIG. 1 is an illustration of DC traction motor current as a function of locomotive wheel speed.
Figure 2:
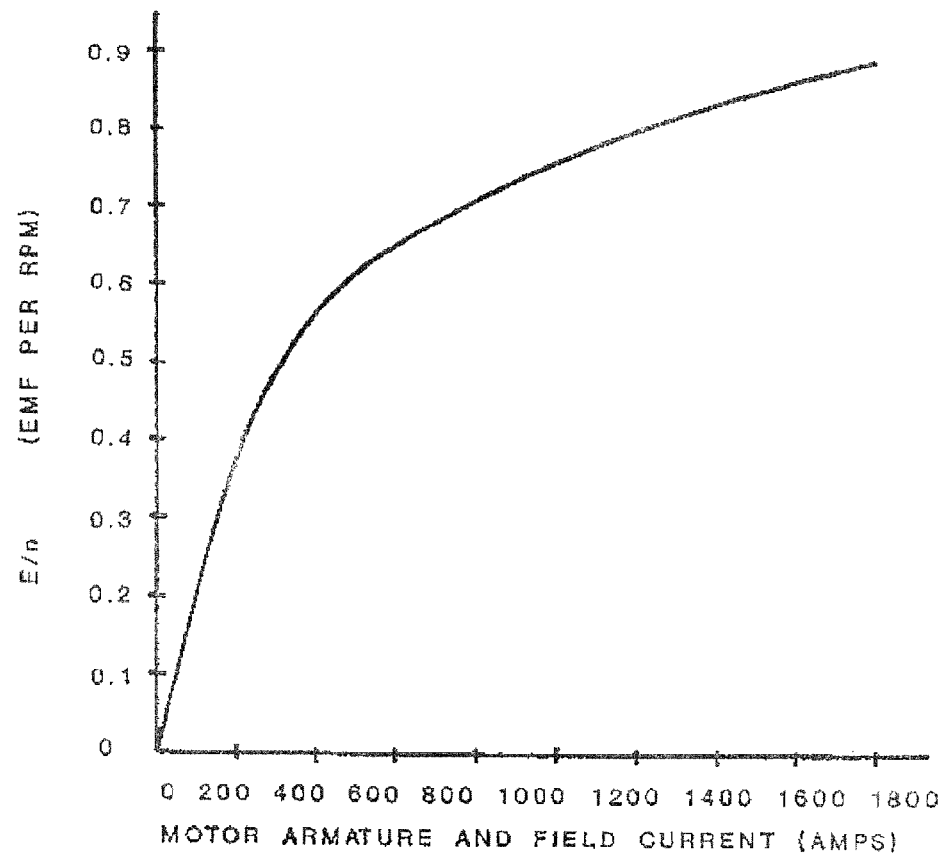
FIG. 2 is an illustration of DC traction motor back-emf per revolution as a function of current.
Figure 3:
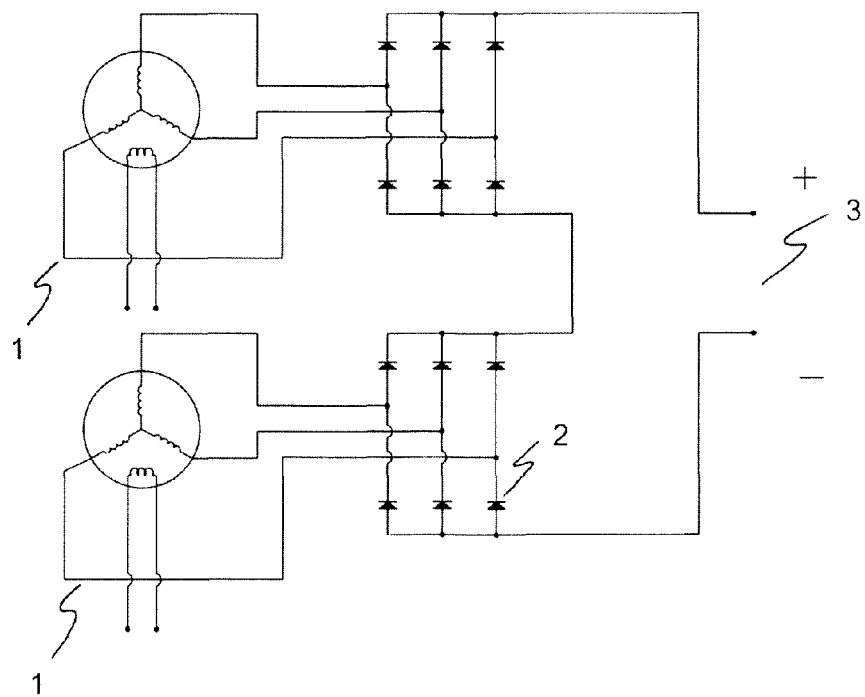
FIG. 3 is a prior art schematic circuit diagram of two engines with alternators with rectifiers in series.

Multi-engine locomotives are known. For example, a multi-engine architecture is described in U.S. Pat. No. 7,304,445 (incorporated by reference in entirety) wherein the alternators with rectifiers of several engines are connected in parallel to a DC bus. In U.S. Pat. No. 7,667,347 (incorporated by reference in entirety), three engines are shown with their alternators with rectifiers connected in series and shown later with the alternator bridge network output connected across a DC bus. The engines driving alternators with rectifiers in series described in U.S. Pat. No. 7,667,347 (incorporated by reference in entirety) are shown in FIG. 3 as prior art. The engines are represented by their output power alternators with rectifiers 1. The engines may be diesel engines, gas turbine engines, or spark ignition engines for example. The 3-phase output from the alternators with rectifiers is rectified by a bridge network of power diodes to provide an approximately DC output at output terminals 3. In this configuration described in U.S. Pat. No. 7,667,347 (incorporated by reference in entirety), twelve (12) rectifying diodes are shown. These rectifying diodes are expensive (typically about $500 to $600 per diode) and require air-cooling. Each air-cooled rectifying diode takes up valuable space in a locomotive engine compartment.

There is about a 1 volt drop across each diode at 6,000 amps, so the waste heat generated per diode represents a useful power loss of about 6 kW at full power.

As any number of engines may have their alternators with rectifiers connected in series, it can be shown that the number of rectifying diodes is equal to 6 times the number of engines driving alternators with rectifiers in series in the U.S. Pat. No. 7,906,862 (incorporated by reference in entirety) configuration.

If Ne=number of engines driving alternators with rectifiers in series and Nd is the number of rectifying diodes, then:

$$Nd=6Ne$$

Figure 6:
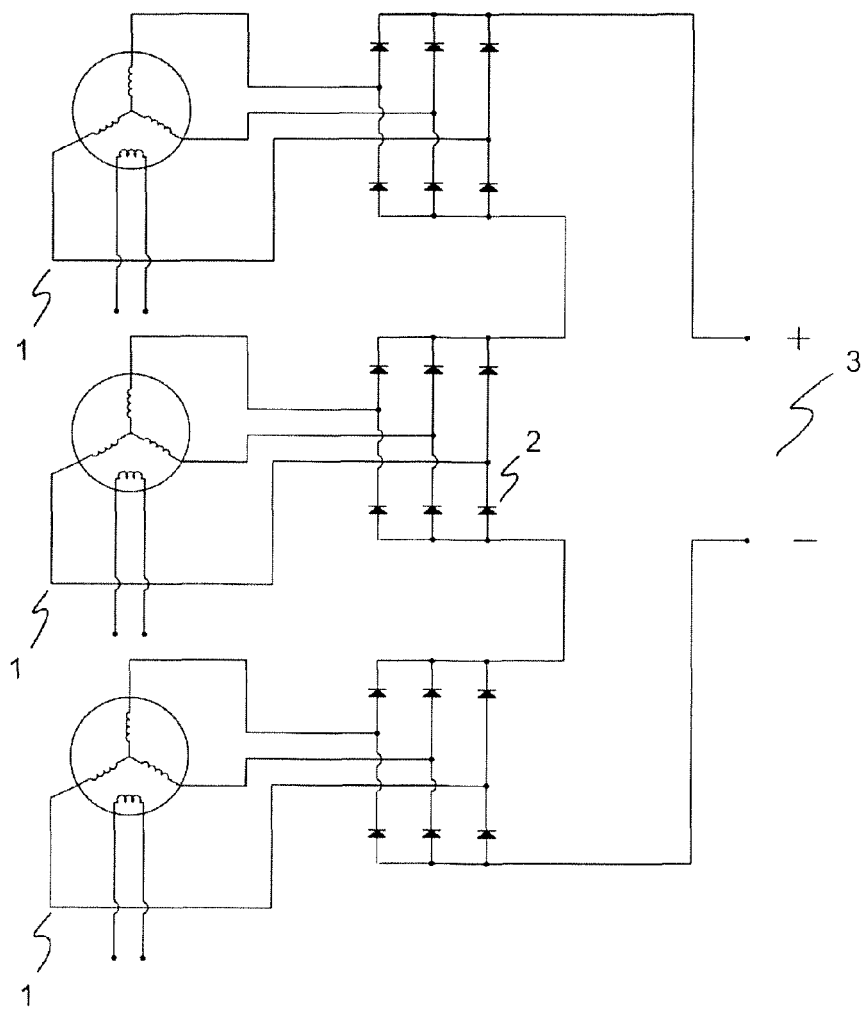
FIG. 6 is a prior art schematic circuit diagram of three engines with alternators with rectifiers in series.

FIG. 6 shows 3 engines driving alternators with rectifiers in series as per U.S. Pat. No. 7,667,347 (incorporated by reference in entirety). The number of rectifying diodes for this configuration is 6 Ne or 18 diodes.

Figure 8:
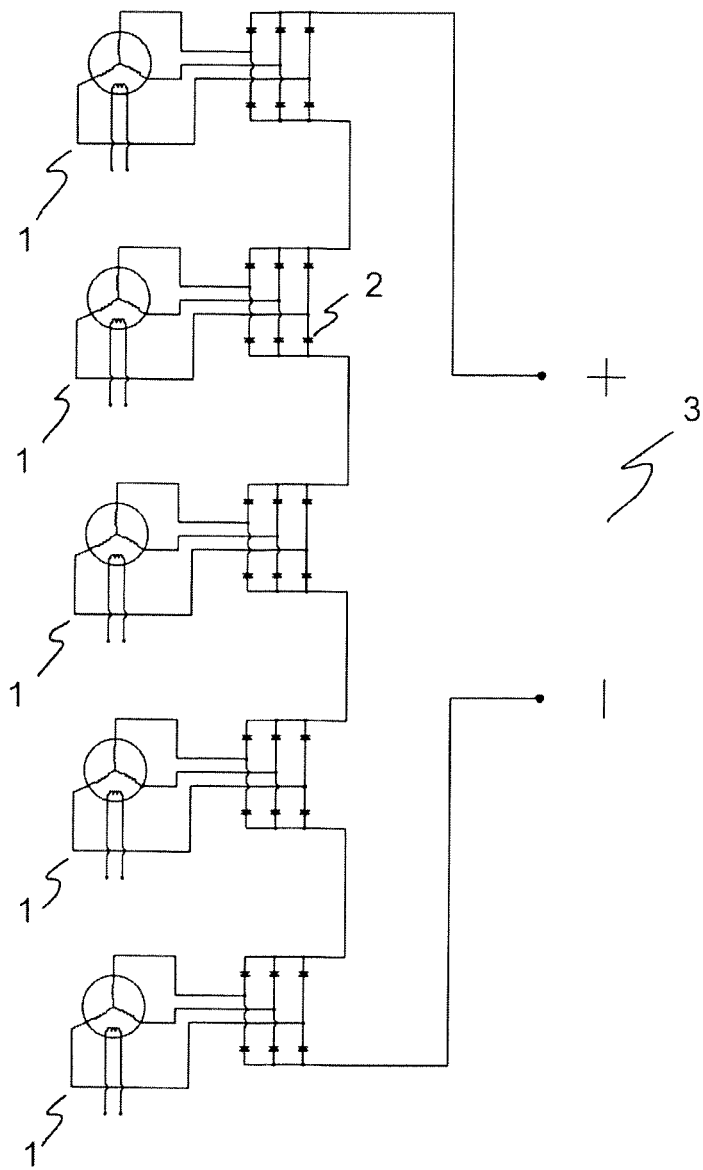
FIG. 8 is a prior art schematic circuit diagram of five engines with alternators with rectifiers in series.

FIG. 8 shows 5 engines driving alternators with rectifiers in series as per U.S. Pat. No. 7,667,347. The number of rectifying diodes for this configuration is 6 Ne or 30 diodes.

Figure 4:
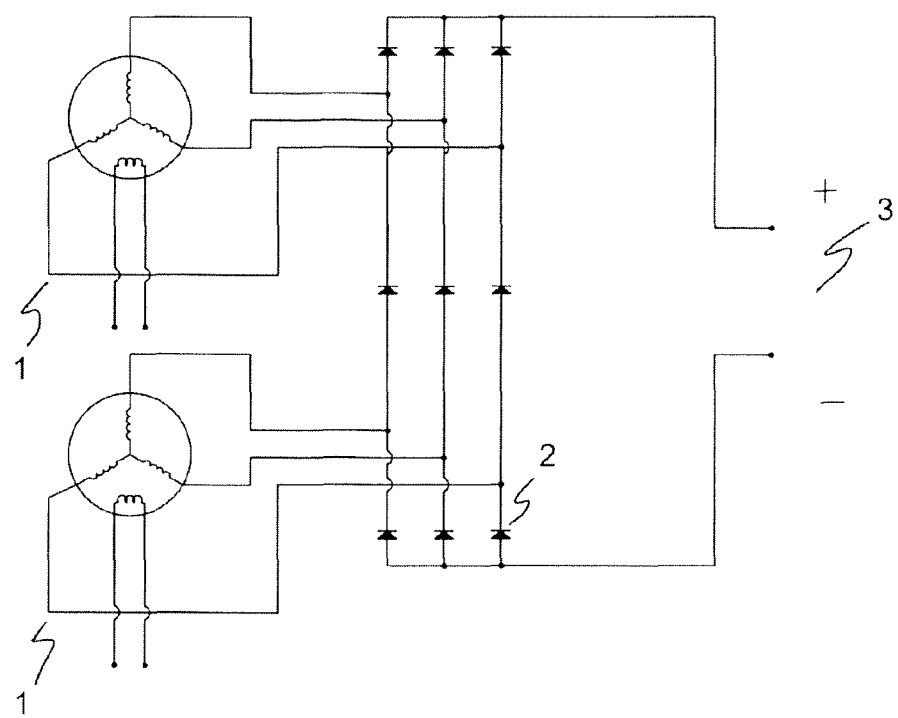
FIG. 4 is a schematic circuit diagram of two engines with alternators with rectifiers in series using fewer diodes than the prior art configuration of FIG. 4.

Present Disclosure of Engines Driving Alternators with Rectifier Bridge Networks in Series FIG. 4 shows an improvement in the allocation of rectifying diodes over that of U.S. Pat. No. 7,667,347 wherein the same rectification is accomplished with 3 fewer diodes than those shown in FIG. 3. This would result in an increase in total locomotive output power of about 18 kW at full power.

It can be shown that the number of rectifying diodes is equal to 3 times the number of engines driving alternators with rectifiers in series plus 3, in the invention disclosed herein.

If Ne=number of engines driving alternators with rectifiers in series and Nd is the number of rectifying diodes, then:

$$Nd=3Ne+3$$

Figure 5:
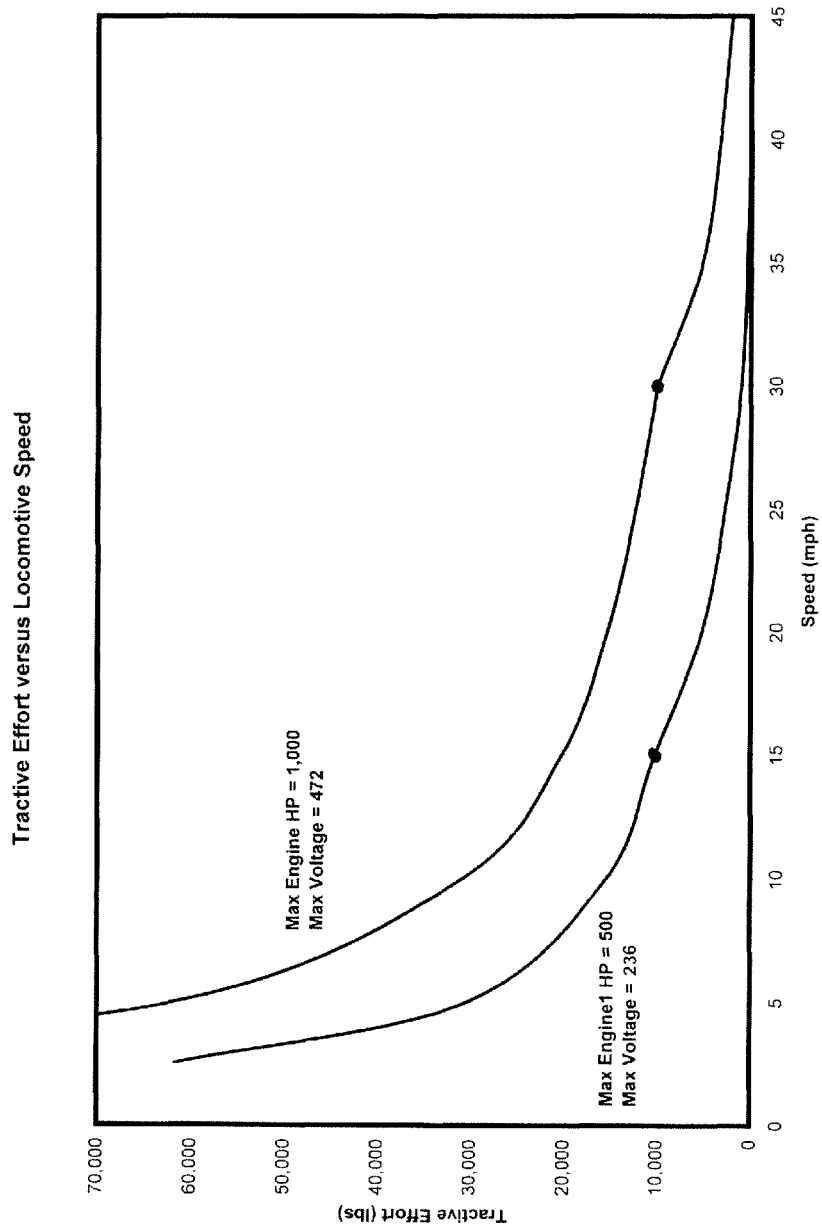
FIG. 5 is graph of tractive effort versus speed for a 1 and a 2 engine locomotive.

FIG. 5 is graph of tractive effort versus speed for a 1 and a 2 engine locomotive. At low speed, current through the traction motors is high and, for a given engine power, P-engine, the output voltage of the alternator diode bridge is low. As current decreases with increasing speed, the output voltage of the alternator diode bridge increases until it reaches it maximum allowable value as indicated by a change in slope of the curve at the black dot. As locomotive speed increases further, the output voltage of the alternator diode bridge remains constant at its maximum value and current continues to decrease as back emf increases. The tractive effort as a function of locomotive speed by the relation:

$$TE=k*P\text{-rail}/spd$$

where TE=tractive effort (lbs)
k=375
P-rail=power at the rails (HP)
spd=locomotive speed (mph)

The overall efficiency of the electrical transmission from alternator to locomotive driven axles is given by P-rail/P-engine. This efficiency is low at high current and tends toward an approximately constant value at low current. The inefficiencies are primarily due to Joule heating ($I^2R$) losses in the electrical leads and traction motor windings.

For a single 500 HP engine, the maximum output voltage of the alternator diode bridge is about 236 volts and is achieved at about 15 mph. For two 500 HP engines configured as shown in FIG. 4, the maximum output voltage of the alternator diode bridge is about 472 volts (272 volts across each alternator) and is achieved at about 30 mph.

Figure 7:
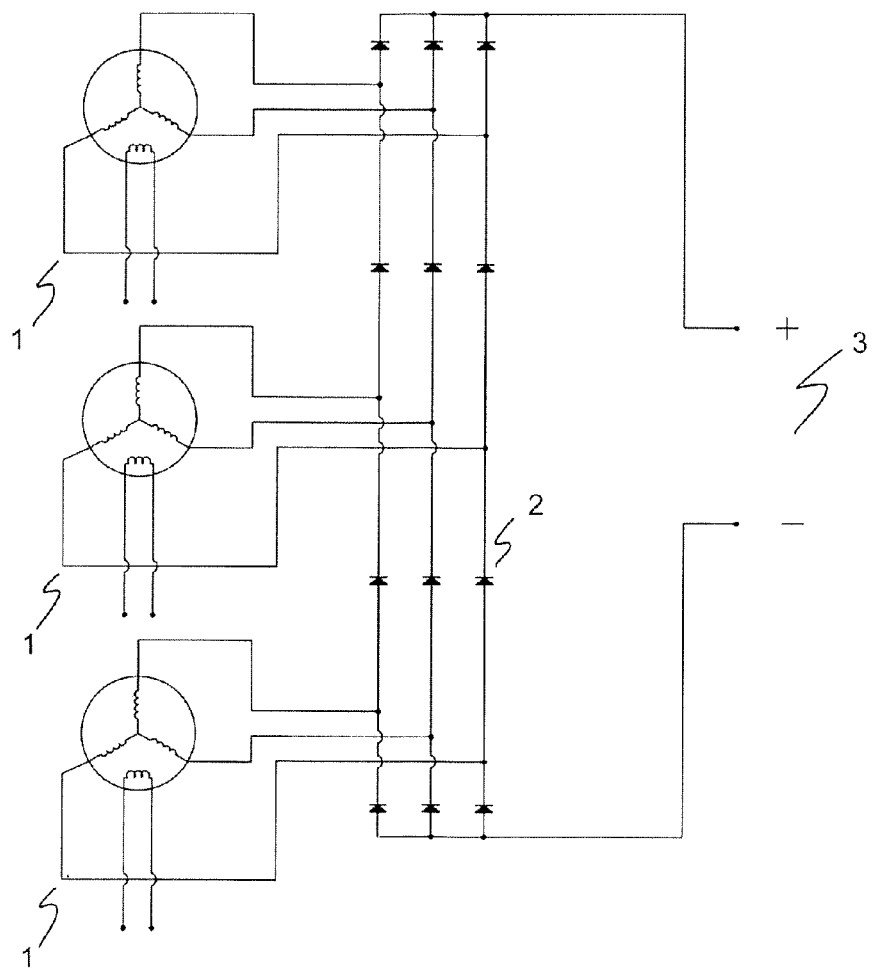
FIG. 7 is a schematic circuit diagram of three engines with alternators with rectifiers in series using fewer diodes than the prior art configuration of FIG. 6.

FIG. 7 shows 3 engines driving alternators with rectifiers in series as per the present disclosure. The number of rectifying diodes for this configuration is 3 Ne+3 or 12 diodes. FIG. 7 shows an improvement in the allocation of rectifying diodes over that of FIG. 6 wherein the same rectification is accomplished with 6 fewer diodes than the configuration of U.S. Pat. No. 7,667,347 (incorporated by reference in entirety). This would result in an increase in total locomotive output power of about 36 kW at full power.

Figure 9:
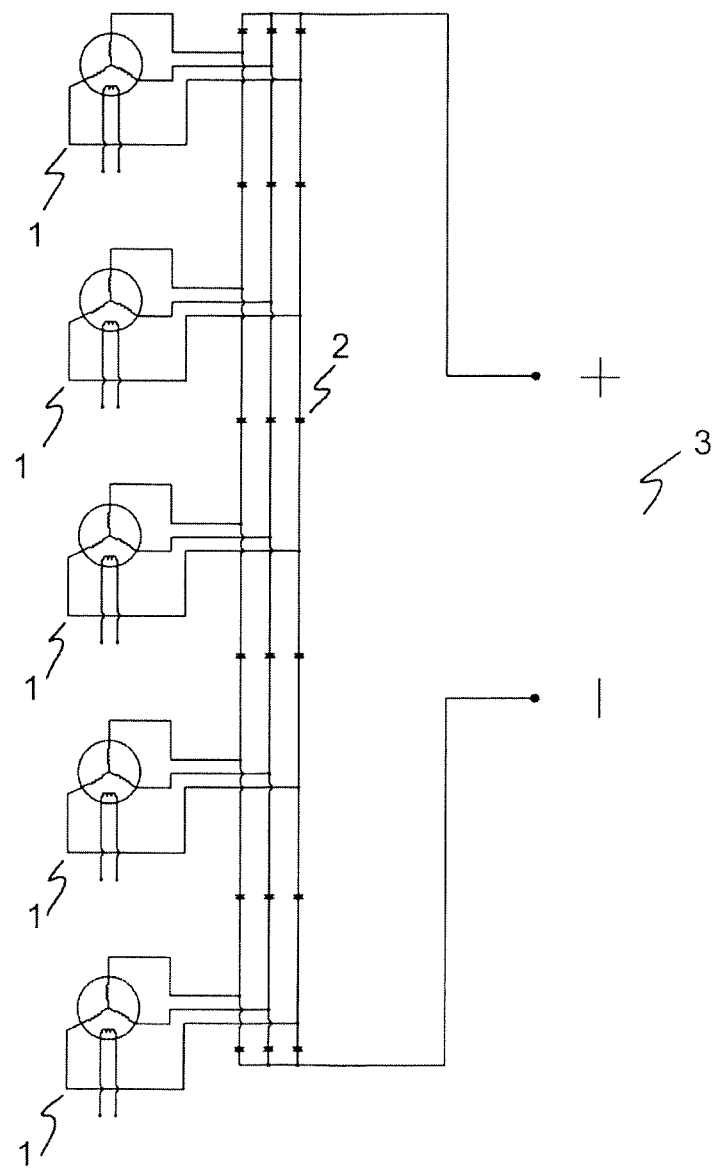
FIG. 9 is a schematic circuit diagram of five engines with alternators with rectifiers in series using fewer diodes than the prior art configuration of FIG. 8.

FIG. 9 shows 5 engines driving alternators with rectifiers in series as per the present disclosure. The number of rectifying diodes for this configuration is 3 Ne+3 or 18 diodes. FIG. 9 shows an improvement in the allocation of rectifying diodes over that of FIG. 8 wherein the same rectification is accomplished with 12 fewer diodes than the configuration of U.S. Pat. No. 7,906,862 (incorporated by reference in entirety). This would result in an increase in total locomotive output power of about 72 kW at full power.

In Summary:

| Number of Engines Driving Alternators with rectifiers in Series | Number of Rectifying Diodes U.S. Pat. No. 7,906,862 | Number of Rectifying Diodes Present Disclosure | Number of Diodes Saved Using Present Disclosure over U.S. Pat. No. 7,906,862 |
|---|---|---|---|
| 2 | 12 | 9 | 3 |
| 3 | 18 | 12 | 6 |
| 5 | 30 | 18 | 12 |

Prior Art Methods of Locomotive Propulsion Using Multiple Engines

Figure 10:
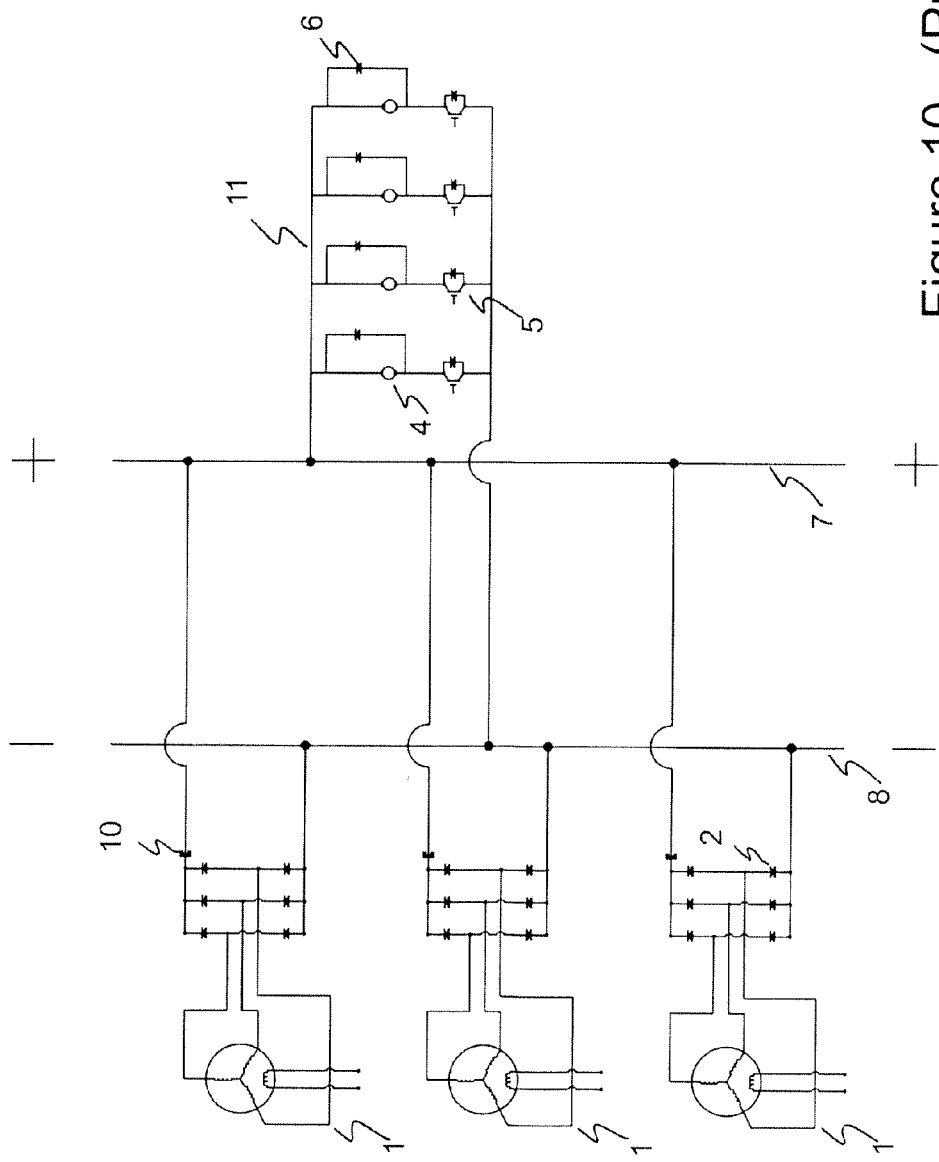
FIG. 10 is a prior art schematic circuit diagram of five engines with alternators with rectifiers in parallel powering 4 traction motors.

As described, for example in U.S. Pat. No. 7,304,445 (incorporated by reference in entirety), and shown in prior art FIG. 10, multiple engines, as represented by their alternators with rectifiers 1, can be connected in parallel to a DC bus. As shown in FIG. 10, several DC traction motors 4 can be powered by the DC bus using well-known chopper circuits to control traction motor voltage and current. The chopper circuit is comprised of traction motor 4, IGBT (power switch) 5 and free-wheeling diode 6. Each engine will provide power to the DC bus only when the voltage output of the engine's alternator exceeds the voltage across the DC bus.

Figure 11:
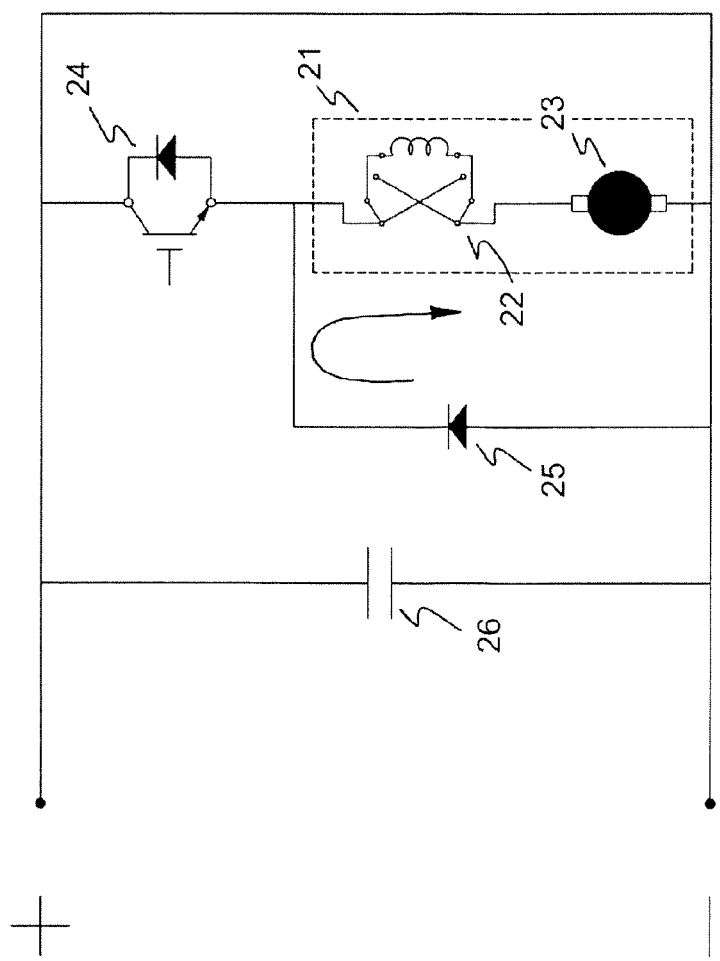
FIG. 11 is a prior art schematic of a DC traction motor with chopper voltage control.

FIG. 11 is a prior art representation of a DC traction motor with voltage control by a chopper circuit. The traction motor 21 is comprised of a field coil across a reverser switch 22 and an armature 23. The current to the traction motor 21 is controlled by an IGBT which switches the DC bus voltage across the traction motor on and off rapidly. When the DC bus voltage across the traction motor is switched off, the current through the DC traction motor free wheels through free-wheeling diode 25 as shown by the closed current path represented by the current circulation arrow.

Figure 12:
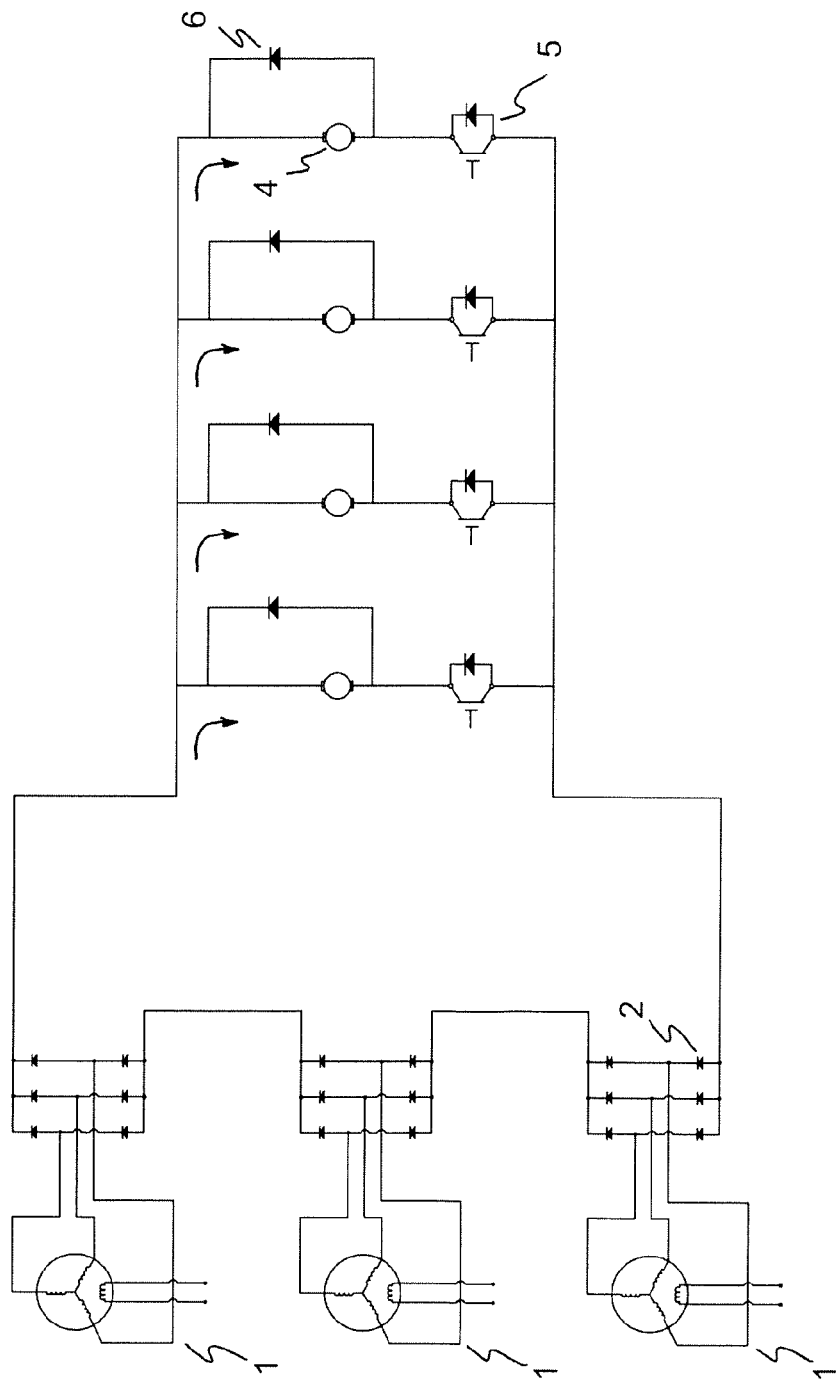
FIG. 12 is a prior art schematic circuit diagram of five engines with alternators with rectifiers in series powering 4 traction motors.

As described, for example in U.S. Pat. No. 7,667,347 (incorporated by reference in entirety), and shown in prior art FIG. 12, multiple engines, as represented by their alternators with rectifiers 1, can be connected in series across a DC bus. As shown in FIG. 12, several DC traction motors 4 can be powered by the DC bus using a well-known chopper circuits to control traction motor voltage and current. A chopper circuit is comprised of traction motor 4, IGBT (power switch) 5 and free-wheeling diode 6. Each engine will provide power to the DC bus for any voltage output of the engine's alternator.

Figure 13:
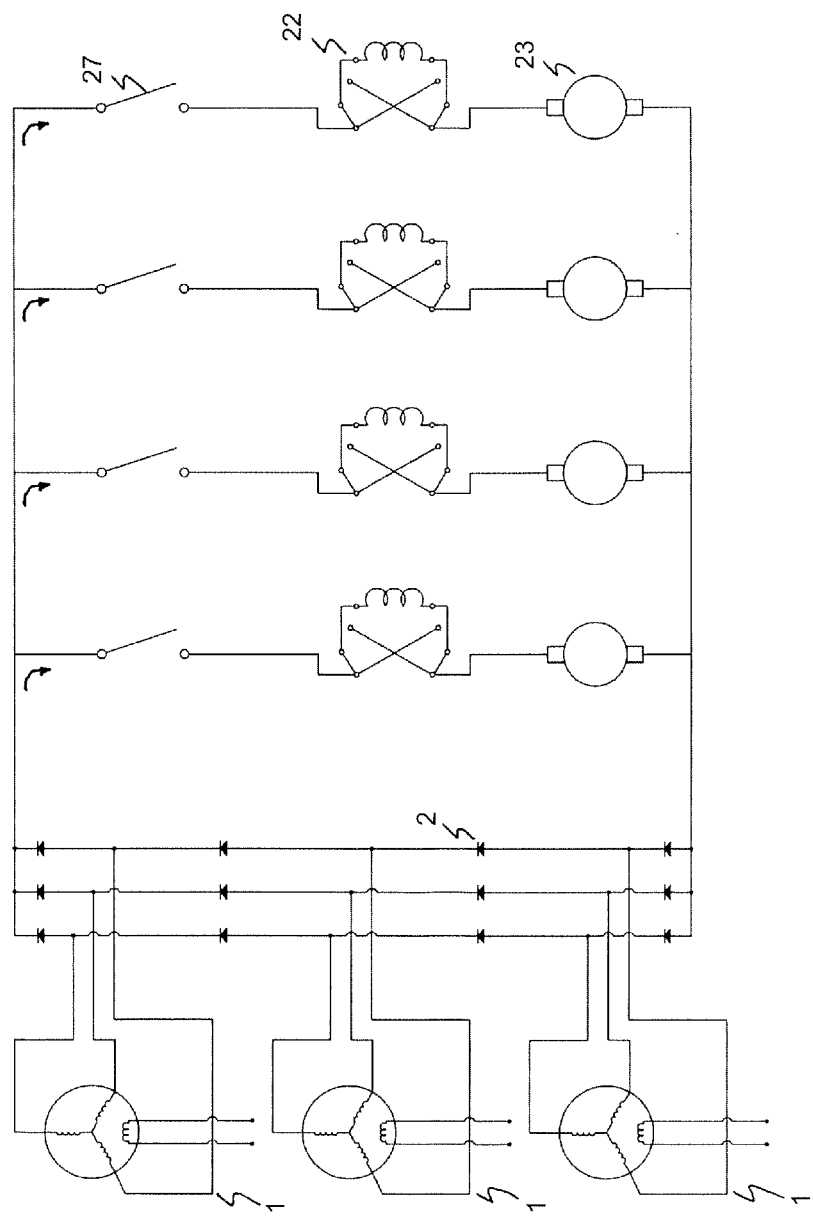
FIG. 13 is a schematic circuit diagram of 3 engines with alternators with rectifiers in series powering 4 traction motors wherein fewer diodes are used than the prior art configuration of FIG. 12 and no choppers are used such as also shown in the prior art configuration of FIG. 12.

Present Disclosure of Traction Motor Circuit for Use on Locomotives Using Multiple Engines FIG. 13 discloses a multi-engine configuration with engines driving alternators with rectifiers in series wherein fewer rectifying diodes are used than the series configuration of U.S. Pat. No. 7,667,347 (incorporated by reference in entirety). In this example, 3 engines are shown powering 4 traction motors. As can be appreciated, the number of engines can be 2 or more and the number of traction motors can be 1 or more.

In addition, the configuration of FIG. 13 also shows a DC traction motor configuration that eliminates the chopper circuits. Each traction motor is comprised of a power contact switch 27, field coil across a reverser switch 22 and an armature 23. Each engine will provide power to the DC bus for any voltage output of the engine's alternator.

The multi-engine configuration of FIG. 13 has several advantages over prior art multi-engine configurations such as those disclosed, for example, in U.S. Pat. No. 7,304,445, U.S. Pat. No. 7,667,347 and U.S. Pat. No. 8,220,572 (each incorporated by reference in entirety). As discussed previously, the number of rectifying diodes is substantially reduced leading to less parasitic power loss and to lower cooling requirements because of less waste heat generation.

By eliminating the chopper circuits on the DC traction motors, the requirement for high speed idle is eliminated. As noted previously, most genset locomotives spend over half their operational time at idle so the ability to idle at low speed or low engine rpms yields significant advantages.

The lifetime of the engines is extended and maintenance requirements for the engines are reduced by eliminating the need for high speed idle.

Fuel consumption and overall emissions are reduced at low speed idle.

Emissions are further reduced since selective catalytic reduction ("SCR") conversion efficiency is optimized. Higher exhaust temperatures are generated at low speed idle and are closer to optimum conditions for efficient SCR than the lower exhaust temperatures characteristic of high speed idle. At low speed idle, exhaust temperatures are higher because the engines are run lean.

Prior art genset locomotives are required to idle at high speed so the engine radiator fans are electrically-driven so they can be turned on and off periodically to save fuel since the power required by cooling fans varies as the cube of engine speed. The extra electrical motors associated with the radiator fans means that the radiator fans cannot be placed at the front of the engines. Eliminating the electrically driven fans by being able to idle at low speed means the radiator fans can be driven by the engines and therefore can be placed in front of the engines and be powered directly by the engines.

As noted previously, genset locomotives typically use an algorithm linked to the throttle to manage engines in order to select a combination of generators to meet the desired overall locomotive power. This has led to some dissatisfaction by locomotive operators who are accustomed to having more operational control and more responsive control over locomotive power, tractive effort and speed. The engine configuration of FIG. 13 restores a simplified engine control system by allowing the locomotive operator to vary engine output by varying the excitation of the engine's alternators to control the voltage across the traction motors. The series configuration also allows the locomotive to keep operating even if one of the engines fails since the remaining engines can usually provide the required voltage to the traction motors by simply by-passing the inoperative engine.

Prior Art Control of Locomotives Using Multiple Engines

Engines Driving Alternators with Rectifiers in Parallel

U.S. Pat. No. 7,667,347 (incorporated by reference in entirety) discloses a method of controlling multiple engines on a locomotive wherein the engines' alternators with rectifiers are electrically connected in parallel across a DC bus. This configuration is used to provide at least four modes of operation—maximum power, maximum fuel efficiency, maximum engine lifetime or minimum emissions. The method is comprised of the following general steps:

1. Determine all the inputs required to set locomotive power requirements, select engines, set the DC bus voltage, set the power and speed of the engines, balance the flow of power from the engines and adjust the load
2. Establish the power requirements for the locomotive are depending on a number of variables determined in step 1.
3. Select the engines to be used. This includes the number of engines, the specific engines, which engines need to be activated for future use and which engines can be deactivated.
4. Select the DC bus voltage.
5. Set the power and speed (rpms) of each engine based on the power requirements and engine operating mode determined in step 2.
6. Measure the power outputs of all engines by measuring current output from each alternator/rectifier system. In this step, the power outputs are balanced so that each engine is contributing its selected share of the output power. This step may be accomplished by adjusting alternator voltage boost, if available, to achieve sufficient output voltage from the alternator/rectifier to provide the required alternator/rectifier output current. This step may alternately be accomplished by adjusting alternator excitation current to achieve the required alternator/rectifier output current. This step may also be accomplished by adjusting engine speed (rpms) to achieve the required alternator/rectifier output current.
7. Adjust the load if load control is used. In this step the power to the load is adjusted to equal the power available from the DC bus. This is accomplished by choppers which are used to regulate DC traction motors or by inverters which are used to regulate AC motors.

Engines Driving Alternators in Series

U.S. Pat. No. 7,906,863 (incorporated by reference in entirety) discloses a method of controlling multiple engines on a locomotive wherein the engines's alternators with rectifiers are electrically connected in series across a DC bus. In series configuration, the output voltage of each engine system providing power to the DC bus is added to produce the voltage across the DC bus. Thus a measurement of the output voltage of an engine system is an accurate measurement of the engine system's power contribution to the DC bus. An engine system's output power is its output voltage times the DC bus current. If only DC bus voltage is measured, an engine system's relative output power compared to the other engines providing power can still be obtained by each engine system's measured output voltage the series configuration. This configuration is used to provide at least four modes of operation—maximum power, maximum fuel efficiency, maximum engine lifetime or minimum emissions. The method is comprised of the following general steps:

1. Determine all the inputs required to set locomotive power requirements, select number of engines, set the DC bus voltage and/or current, set the power and speed of the engines, balance the flow of power from the engines and adjust the load
2. Establish the power requirements for the locomotive are depending on a number of variables determined in step 1.
3. Select the engines to be used. This includes the number of engines, the specific engines, which engines need to be activated for future use and which engines can be deactivated.
4. Select the DC bus voltage.
5. Set the power and speed (rpms) of each engine based on the power requirements and engine operating mode determined in step 2.
6. Measure the power outputs of all engines by measuring output voltage of each engine's alternator/rectifier system. In this step, the power outputs may be balanced so that each engine is contributing its selected share of the output power. This step may be accomplished by adjusting alternator voltage boost, if available, to achieve sufficient output voltage from the alternator/rectifier to provide the required alternator/rectifier output current. This step may alternately be accomplished by adjusting alternator excitation current to achieve the required alternator/rectifier output current. This step may also be accomplished by adjusting engine speed (rpms) to achieve the required alternator/rectifier output current. The current in the DC bus is the same as the current measured in each engine's diode bridge.
7. Adjust the load if load control is used. In this step the power to the load is adjusted to equal the power available from the DC bus. This is accomplished by choppers which are used to regulate DC traction motors or by inverters which are used to regulate AC motors.

Present Disclosure of Control of Locomotives Using Multiple Engines

In the present disclosure, control of the power output of the engines driving alternators with rectifiers in series engines differs from that of the prior art engines driving alternators with rectifiers in series in that the engine outputs are monitored and controlled by conventional means and there is no need for load control by chopper circuits. In the present disclosure, the engines's alternators with rectifiers are electrically connected in series across a DC bus but with fewer diodes in the bridge network to achieve the same rectification as prior art configurations.

Each engine has an Engine Control Unit ("ECU"). One of its many possible readouts is the percentage of full load capacity that the engine is outputting. Another readout is the aggregate amount of fuel burned by each engine which is substantially a direct measure of engine lifetime.

The configuration of FIG. 13 may be used to provide at least four modes of operation—maximum power, maximum fuel efficiency, maximum engine lifetime or minimum emissions.

The method is comprised of the following general steps:
1. Determine all the inputs required to set locomotive power requirements, select engines, set the DC bus voltage and/or current, set the power and speed of the engines, balance the flow of power from the engines and adjust the load
2. Establish the power requirements for the locomotive are depending on a number of variables determined in step 1.
3. Select the engines to be used. This includes the number of engines, the specific engines, which engines need to be activated for future use and which engines can be deactivated.
4. Select the DC bus voltage
5. Set the power and speed (rpms) of each engine based on the power requirements and engine operating mode determined in step 2.
6. Determine from each engine's ECU the percentage load outputs of each of the engines. In this step, the power outputs may be balanced so that each engine is contributing its selected share of the output power. This step may be accomplished by adjusting alternator excitation current to achieve the required alternator/rectifier output current. This step may also be accomplished by adjusting engine speed (rpms) to achieve the required alternator/rectifier output current. This step may also be accomplished by adjusting a combination of alternator excitation current and engine speed (rpms) to achieve the required alternator/rectifier output current.

The balancing of each engines output power can be accomplished manually by the locomotive engineer which would give the engineer more direct control over the operation of the locomotive. The engineer would have access to a screen on which the percentage of each engines load capacity is displayed as provided by each engine's ECU. The engineer would have an engine control means so that he could select which engines to participate and control each engines power output.

The locomotive engineer would also have access to each engine's aggregate amount of fuel burned and could thus make decisions on engine lifetime—whether to shut down an engine or schedule an engine for servicing or replacement.

Thus the decision on which mode to favor (maximum power, maximum fuel efficiency, maximum engine lifetime or minimum emissions) would be under control of the locomotive engineer and not rely on a control computer.

Figure 14:
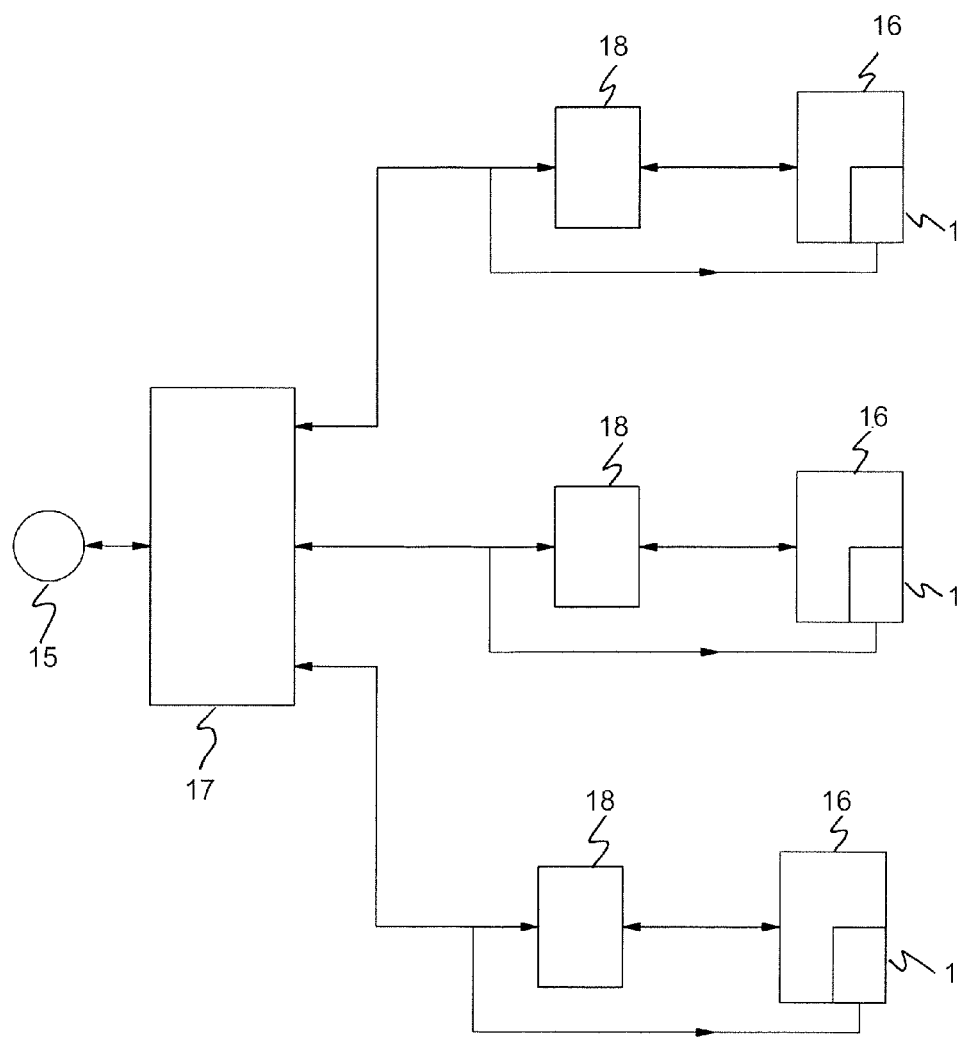
FIG. 14 illustrates the flow of information and control for three engines connected in series To assist in the understanding of one embodiment of the present disclosure the following list of components and associated numbering found in the drawings is provided herein.

FIG. 14 illustrates the flow of information and control for 3 engines connected in series. The engineer 15 receives information and issues commands to a micro-controller 17. Micro-controller 17 then sends instructions and receives information to each ECU 18 which in turn sends instructions and receives information to each engine 16. Each engine 16 comprises an alternator 1. Micro-controller 17 also sends instructions to the excitation coil of each alternator 1. The micro-controller 17 then controls and balance the power output of each engine according to the instructions of engineer 15. As can be appreciated, this flow of information and control can be applied to any number of engines 16 connected in series.

The disclosure has been described with reference to the preferred embodiments. Modifications and alterations will occur to others upon a reading and understanding of the preceding detailed description. It is intended that the disclosure be construed as including all such modifications and alterations insofar as they come within the scope of the appended claims or the equivalents thereof.

A number of variations and modifications of the disclosure can be used. As will be appreciated, it would be possible to provide for some features of the disclosure without providing others.

The present disclosure, in various embodiments, includes components, methods, processes, systems and/or apparatus substantially as depicted and described herein, including various embodiments, sub-combinations, and subsets thereof. Those of skill in the art will understand how to make and use the present disclosure after understanding the present disclosure. The present disclosure, in various embodiments, includes providing devices and processes in the absence of items not depicted and/or described herein or in various embodiments hereof, including in the absence of such items as may have been used in previous devices or processes, for example for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover though the description of the disclosure has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A traction power system for use with a multi-engine locomotive, the system comprising:
    at least two engines, each engine comprising an alternator with a rectifier bridge, each rectifier bridge comprising diodes, a total number of the at least two engines defining an engine count, a total number of the diodes across all rectifier bridges defining a diode count;
    wherein the rectified outputs of the alternators are electrically connected in series across a DC bus;
    wherein the diode count is less than six times the engine count;
    wherein the diodes are grouped in sets of three diodes;
    wherein a single first set of three diodes is coupled between a first output terminal and a first set of outputs from the alternator of a first engine in the at least two engines;
    wherein a single second set of three diodes is coupled between the first set of outputs and a second set of outputs from the alternator of a second engine in the at least two engines;
    a single third set of three diodes is coupled between the second set of outputs and one of a second output terminal or a third set of outputs from the alternator of a third engine in the at least two engines; and
    wherein the first output terminal and the second output terminal are coupled to the DC bus.

2. The system of claim 1, wherein the at least two engines comprise at least one DC traction motor.

3. The system of claim 2, wherein each DC traction motor is associated with a power contact switch and a reverser switch.

4. The system of claim 1, wherein chopper circuits are not utilized and the diode count is three plus three times the engine count.

5. The system of claim 1, wherein the at least two engines each further comprise an engine control unit.

6. The system of claim 5, further comprising a microcontroller in communication with each engine control unit and with each engine alternator.

7. The system of claim 6, wherein the microcontroller controls a power output of the multi-engine locomotive by varying speed and power of at least one engine.

8. The system of claim 7, wherein the microcontroller controls the power output without a chopper circuit.

9. The system of claim 8, wherein the microcontroller is configured to operate the multi-engine locomotive in operational modes comprising maximum power, maximum fuel efficiency, maximum engine lifetime and minimum emissions.

10. The system of claim 1, wherein the multi-engine locomotive is configured to idle at low speed.

11. The system of claim 1, wherein the at least two engines include two engines of different sizes, wherein the two engines comprise alternators and rectifiers of a same current handling capacity.

12. The system of claim 1, wherein the at least two engines include two engines that are configured to operate at different speeds and at different outputs.

13. The system of claim 1, wherein the at least two engines include engines that are configured to operate from a throttle at a same speed and same output.

14. The system of claim 1, wherein the at least two engines include two engines that are configured for selective operation.

15. A method to control power output for use with a multi-engine locomotive, the method comprising:
    providing a traction power system comprising at least two engines, each engine including an engine and load control system and an alternator with a rectifier bridge, each rectifier bridge comprising diodes, a total number of the at least two engines defining an engine count, a total number of the diodes across all rectifier bridges defining a diode count, wherein the rectified outputs of the alternators are electrically connected in series across a DC bus, wherein the diode count is less than six times the engine count;
    selecting a set of engines of the multi-engine locomotive;
    selecting a DC bus voltage;
    setting a desired power level for the set of engines; and
    balancing the set of engines to achieve the desired power level;
    wherein the diodes are grouped in sets of three diodes;
    wherein a single first set of three diodes is coupled between a first output terminal and a first set of outputs from the alternator of a first engine in the at least two engines;
    wherein a single second set of three diodes is coupled between the first set of outputs and a second set of outputs from the alternator of a second engine in the at least two engines;
    a single third set of three diodes is coupled between the second set of outputs and one of a second output terminal or a third set of outputs from the alternator of a third engine in the at least two engines; and wherein the first output terminal and the second output terminal are coupled to the DC bus.

16. The method of claim 15, further comprising the step of receiving a load set-point output from the engine control system of each engine.

17. The method of claim 15, wherein the balancing is performed by at least one of adjusting an alternator excitation current and adjusting an engine speed of the at least two engines.

18. The method of claim 17, wherein the balancing is performed manually.

19. The method of claim 15, wherein the at least two engines comprise at least one DC traction motor.

20. The method of claim 19, wherein each DC traction motor is associated with a power contact switch and a reverser switch.

21. The method of claim 15, wherein chopper circuits are not utilized and the diode count is three plus three times the engine count.

22. The method of claim 15, wherein the multi-engine locomotive is configured to idle at low speed.

23. The method of claim 15, further comprising a microcontroller in communication with an engine control unit in each engine control system and with each engine alternator.

* * * * *